Jan. 20, 1970   W. R. VORAN   3,490,418
POULTRY CAGE FOR GROWING BIRDS
Filed Feb. 1, 1968   2 Sheets-Sheet 1

INVENTOR.
WILLIS R. VORAN
BY
ATTORNEYS

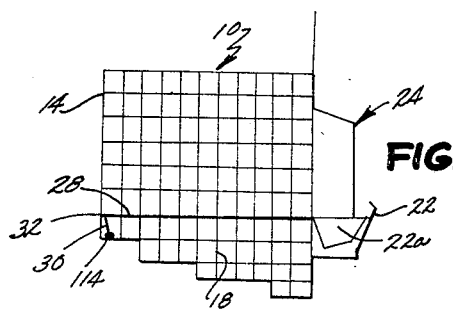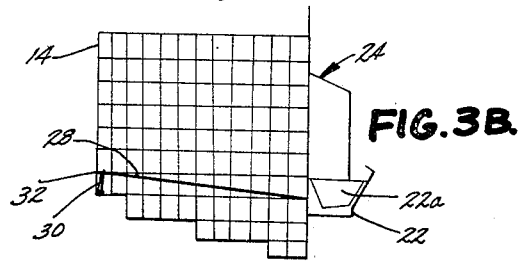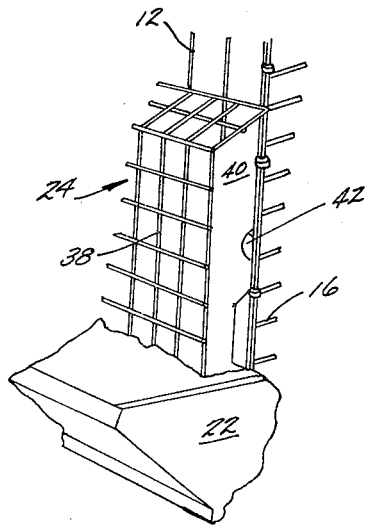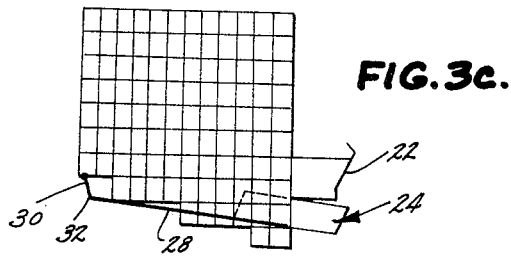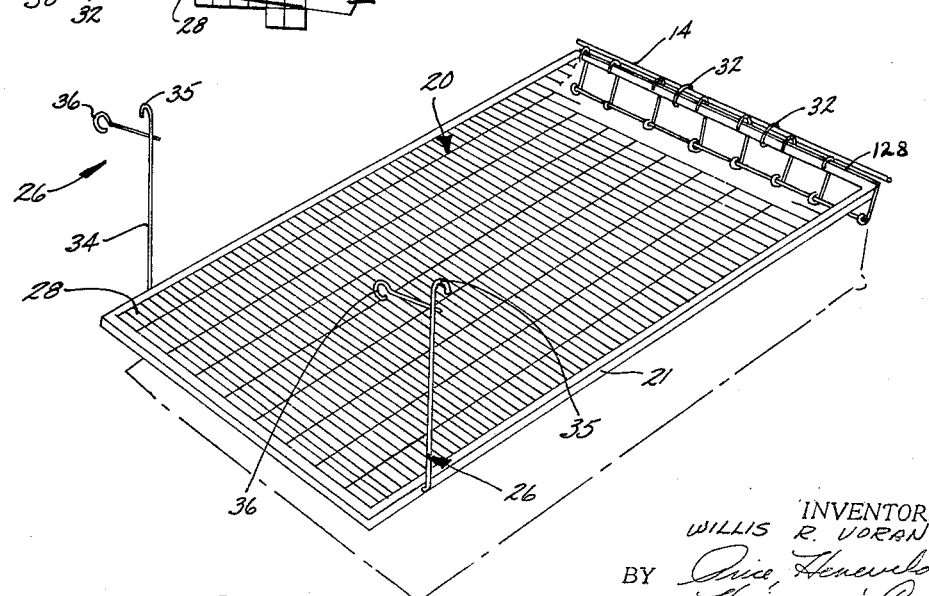

United States Patent Office 3,490,418
Patented Jan. 20, 1970

3,490,418
POULTRY CAGE FOR GROWING BIRDS
Willis R. Voran, Zeeland, Mich., assignor, by mesne assignments, to U.S. Industries, Inc., New York, N.Y., a corporation of Delaware
Filed Feb. 1, 1968, Ser. No. 702,348
Int. Cl. A01k 31/06
U.S. Cl. 119—48                                    18 Claims

ABSTRACT OF THE DISCLOSURE

A poultry cage for housing birds throughout the period of their growth, wherein a cage floor is provided which is pivotally adjustable with respect to the walls of the cage and which has an integral knee or hinge joint which allows the floor to be vertically shifted upwardly or downwardly, in order to better accommodate the birds at their various changing sizes during their growth. Also, a chick guard is provided which is detachably mountable over the front of the cage, extending upwardly from the feeder trough typically located there, by which chicks who have managed to pass through the front wall of the cage will be prevented from escaping the cage altogether. This chick guard may, upon moderate growth of the chicks, be removed from the cage to assure unimpeded access to the feed, and the guard may upon further growth of the birds be detachably mounted at the underside of the cage to form an effective extension of the floor thereof and provide an egg-collection receptacle or tray.

Background

The growing of poultry in confinement cages is becoming increasingly more prevalent in the United States, and at the present time most if not all large poultry installations utilize such cages. Normally, different types of these cages are designed for different types and different sizes of birds. For example, mature laying birds maintained for egg production are typically housed in cages having an inclined floor down which eggs laid within the cage will roll in order to pass through appropriate openings at the front of the cage for automatic collection. On the other hand, birds raised only for meat production need not be housed in cages particularly adapted for automated egg collection. Very young chicks must generally be raised to a certain minimum size outside of cages, on floors and in brooder installations, until they become large enough to take feed and water for themselves from the feeding and watering mechanisms typically located at the front of the cages. When they have achieved this minimum size, the chicks are usually placed in "starter" cages specifically designed for small birds. Thus, the birds are already accustomed to one type of environment when they are first placed in their starter cages, and this requires a definite period of adjustment during which many birds go off their feed, do not eat properly, and sicken. Also, the starter cages in which the young birds are first placed must be different in at least some particularities from cages used only for larger and more mature birds, particularly in connection with the height of the floor at the front of a cage and its relationship to the feeding and watering mechanisms. Consequently, the birds must be moved once again after having attained additional growth, when they are of mature size, or very nearly so, thereby requiring even greater outlays of labor and time.

Because of the foregoing circumstances and the situation provided thereby, it has become customary for manufacturers to provide a plurality of specific different types of cages for the different types and sizes of birds. This is not a favorable situation for the poultry growers, since it necessitates duplication in cage costs as well as the sizeable expenditure of time and labor in physically moving birds from one type of cage to another each time that the birds mature to a new and different particular size.

Summary

In accordance with the present invention, a poultry cage construction is provided in which birds may be kept throughout their entire growing age, from the day after they hatch until the time many months later when they are moved to their permanent or regular laying cages; indeed, the present cage construction will even accommodate birds who have matured to the point where they have begun to lay eggs, even though the present construction is not intended as a regular or permanent laying cage. Consequently, the present cage construction allows birds to be placed in a cage very much earlier than was previously true, thereby effecting a desirable pre-conditioning of them to cage life and eliminating growth and production setbacks otherwise typically encountered when the birds are first introduced into cages at a later stage of their life, while at the same time eliminating a very substantial amount of bird handling and other associated labor.

The poultry cage of the invention comprises in essence a cage enclosure with a floor which is pivotally mounted with respect to the cage walls to permit vertical adjustment of the forward edge of the floor, adjacent the feeding and watering troughs, in order to directly accommodate the birds in the numerous different stages of their growth and development; also, the rearward edge of the floor includes a hinge-like knee joint which allows for vertically shifting the rearward level of the floor a major amount. Further, the present cage has a chick retainer or guard which restricts the amount of the feeder trough which is accessible to the chicks, to prevent feed spillage and waste. This guard also retains any chick who has made his way directly through the larger-mesh front side of the cage and into the feeder trough itself, to prevent any such chick from making his way into other adjoining cages or from injuring itself by jumping or falling from the elevated cage. Moreover, this chick retainer or guard is detachably mountable to the front of the cage and, upon detaching the same, is made to be directly attachable at the floor level of the cage, to serve as an egg-collection receptacle at the time when some or even all of the birds have matured to the point where they begin to lay eggs.

Drawings

Figure 6:
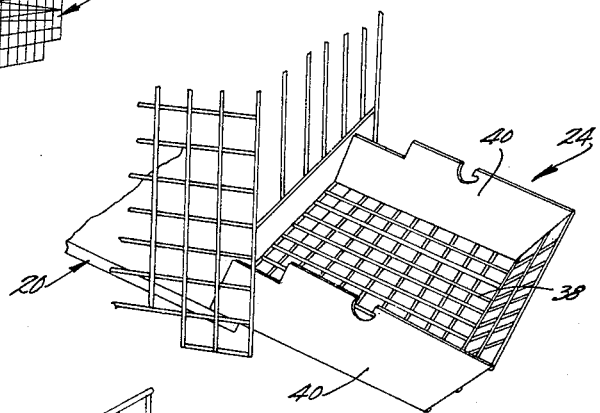

FIG. 3a, 3b, and 3c are pictorial side elevational views of the present construction, illustrating the full range of floor adjustment and the dual mounting of the chick retainer-egg collection tray device;

FIG. 4 is an enlarged fragmentary perspective view showing the hinging knee joint in the floor construction;

FIG. 5 is a fragmentary perspective view showing the chick retainer member in a first of its two possible operative positions; and FIG. 6 is a fragmentary perspective view showing the structure of FIG. 5 in an egg-collection position.

Preferred embodiment

Figure 1:
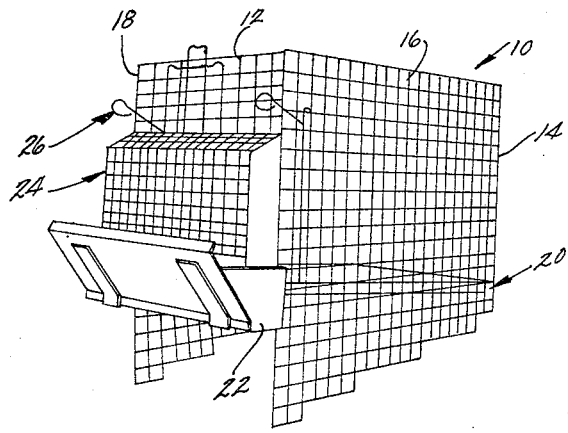
FIG. 1 is a frontal perspective view of a single cage enclosure embodying the construction of the invention.

As illustrated in FIG. 1, the present poultry cage construction comprises a cage enclosure 10 defined by front and rear walls 12 and 14, respectively, and spaced side walls 16 and 18; also, the cage enclosure includes a floor member 20 which closes the bottom opening thereof. As will be observed in FIG. 1, the side walls 16 and 18 extend well below the particular level of the floor 20 shown in this figure. Further, the bottom edge of these sides have a step-like configuration, increasing in their downward extent as they near the front of the cage. A feeder trough 22 extends along the front wall of the cage enclosure, and a chick guard and retainer means 24 extends upwardly from the trough 22 along the outside of the front wall 12. As illustrated, the various walls of the cage enclosure are of mesh construction, preferably of mutually interconnected wire rods or the like, and the cage enclosure should have a top of the same material. These wall portions may be of moderately open mesh, as for example with one by two inch openings. The floor member 20 is also of metal mesh work, but the floor should be of smaller mesh openings (such as one-half by one or one-half by two inches) in order to better accommodate the small feet of the baby chicks to be placed in the enclosure.

Figure 2:
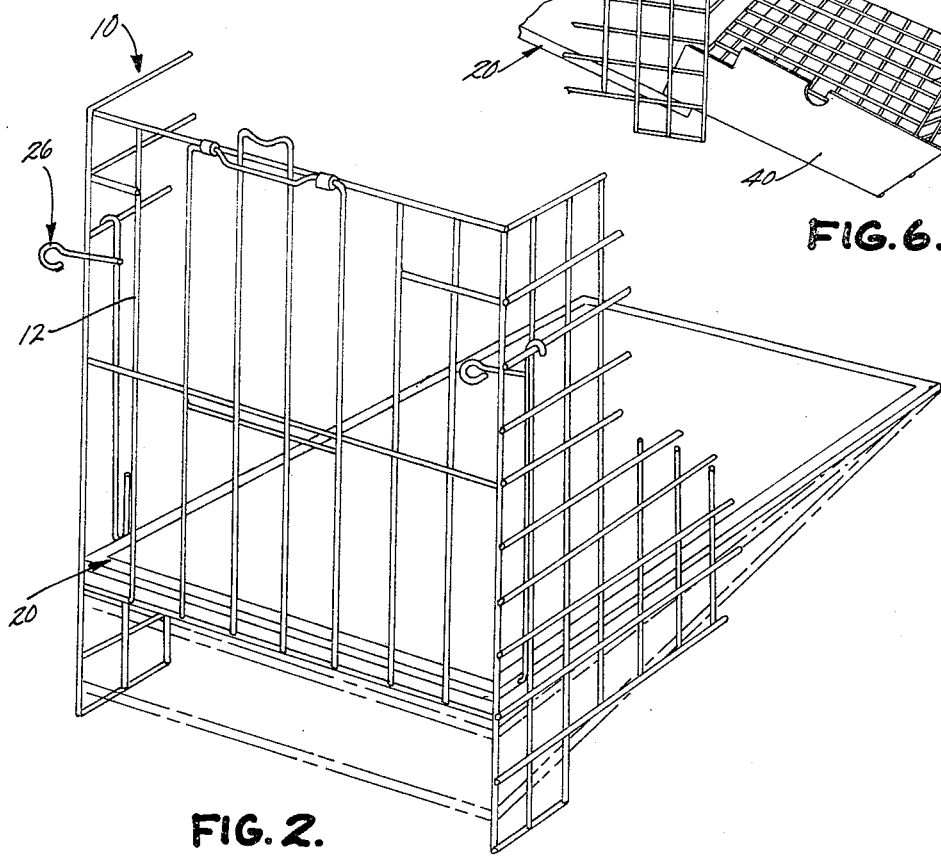
FIG. 2 is an enlarged fragmentary perspective view of a portion of the cage of FIG. 1, showing adjusted positions of the floor in phantom lines.

As illustrated in FIG. 2, the floor member 20 is vertically adjustable to any of a number of different positions, including a generally horizontal position wherein the floor member is well above all points on the bottom edge of the side walls 16 and 18, and a number of different downwardly-inclined positions, wherein the floor becomes increasingly sharply inclined with respect to the horizontal and ultimately will lie along the step-like bottom extremity of the side walls. These adjustments in the position of the floor are accomplished by a hinged or pivotal connection of the rear edge of the floor to the rear wall 14 of the enclosure, together with releasable arresting means 26 by which the forward edges of the floor member may be held in arrestment at various desired positions upon the side walls 16 and 18.

The floor member 20 is seen in more detail in FIG. 4, wherein it may be observed that this member may have a peripheral frame 21 of sheet metal or the like for purposes of rigidity and strength, inasmuch as the floor is not rigidly attached to either the front wall 12 or the two side walls 16 and 18, but is instead adjustably suspended at its forward extremity by the arresting means 26 noted previously. It will be observed that the floor member 20 is comprised of a pair of mutually hinging floor parts 28 and 30 which are joined by a transverse hinge or knee joint 32. Floor part 28 is a relatively large main portion of the floor and extends forwardly to the front wall 12 thereof, whereas floor part 30 is a relatively small flap-like part, located directly adjacent the rear wall 14 of the cage enclosure, with one edge secured to the rear wall by a pivotal interconnection. That is, the smaller floor part 30 may consist of a series of short wire rods whose two ends each define eyelets, with the eyelet at one end of each such rod encircling a horizontal rod 114 comprising a part of the rear wall 14, and with each of the other eyelets encircling a horizontally-extending rod 128 which forms the rearward end extremity of the larger floor part 28; of course, there are other structural embodiments which would serve essentially the same function with equal facility.

In any event, it will be apparent that both floor parts 28 and 30 are pivotal with respect to member 114 of the rear side 14, and also that the larger floor part 28 is pivotal with respect to the smaller floor part 30, about member 128. Consequently, the position of floor parts 28 and 30 may be that indicated in solid lines in FIG. 4, i.e., with floor part 30 extending upwardly from wall member 114 and floor part 28 vertically elevated, or alternatively, the smaller floor part 30 may hang downwardly from member 114 to place the larger floor part 28 in the lower position shown in phantom. In the first such case, floor part 30 may be secured in its upright position by any desired mechanical fastener extending between it and the wall 14, as for example a "hog ring" type wire encirclement, which can later be easily cut away and discarded in order to drop the floor part 30 into its lower position.

FIG. 4 also illustrates a preferred form for the arresting means 26 noted previously, by which the forward extremities of the larger floor part 28 may be held in a variety of desired positions with respect to the front wall 12 of the cage. Arresting means 26 is preferably comprised of a pair of upright post members 34, each pivotally connected to the edge of the floor part 28, as for example by passing through an appropriate aperture in the peripheral frame 21 thereof. Each of the upright posts 34 carries a laterally-extending hook portion 35 at its uppermost extremity, with each such portion oriented outwardly, toward the particular side wall 16 or 18 which is directly adjacent, such that hooking portions 35 may be extended through and hooked over the mesh of the adjacent side wall to anchor the floor in position by suspending it from such side wall. Also, each of the upright posts 34 has an operating handle 36 in the form of a loop extending toward the front wall 12 of the cage. As illustrated in FIGS. 1 and 2, loops 36 extend outwardly through the mesh front wall for easy access, such that the floor 20, or at least the larger floor part 28 thereof, may readily be pivoted with respect to the rear wall 14 as by inserting a finger of each hand through the loops 36 to unhook the hooking portions from the mesh sidewalls, raising or lowering the floor the desired amount, and then re-hooking the hooking portions 35 in a different place upon the mesh sides.

The full range of possible floor adjustment in the present cage construction is illustrated in FIGS. 3a, 3b, and 3c. In FIG. 3a, it will be observed that the smaller floor part 30 extends upwardly from its pivotal mounting to the rear wall 14, and that the larger floor part 28 is in a highly elevated, generally horizontal position, at substantially the same height as the top of the feeder trough 22, with the step-like lower extremity of side wall 18 well below the level of the floor portion 28. This is the position for very young chicks, at the early stages of their lives, such as between the ages of one day to about two weeks; as may be observed for this position, an inner liner or insert 22a may be placed within the feeder trough 22 in order to maintain a smaller total amount of feed in it and make the feed more accessible to the tiny young birds. It is to be noted that for very young birds of this age grouping, the floor part 28 is preferably inclined downwardly at a very slight angle toward the feeder trough 22, to encourage the young birds to go to the front of the cage and take feed and water; however, this inclination should be relatively slight, so that undue crowding does not occur at the front of the cage.

In FIG. 3b the smaller floor part 30 remains in an upright position, but the larger floor part 28 has been pivoted about the transverse hinge joint 32, to incline downwardly toward the front of the cage at a sharper angle, i.e., with the front edge extremity of floor part 28 lowered with respect to its previous position. This change of position in the floor is to take place at about the two-week point in the age of the birds, and is suitable for about the next three weeks, i.e., until the birds are about five weeks old. As illustrated, the feeder trough insert 22a continues to be useful during this period of life for the birds, and the trough 22 may be left in the same vertical position which it previously occupied.

In FIG. 3c, the floor has been lowered the maximum extent. Here it is to be noted that the smaller floor part 30 depends downwardly from the point of its attachment to the rear wall 14, i.e., the transverse hinge joint 32 has been reversed in order to drop the rear extremity of floor part 28 downwardly. As illustrated, this places the level of floor part 28 well below the level of the feeder trough 22, in a general arrangement well suited to more mature birds. At this point in time, both the feeder trough insert 22a and the chick guard means 24 have fulfilled their respective purposes and are no longer required. Consequently, these may now be removed. The birds may be kept in the cage under these conditions for a very considerable length of time, until about twenty-two weeks of age, when they have matured to the point of early egg production.

Slightly before the stage of early egg production is reached, the chick guard means 24, which has previously been removed from its initial position upon the cage enclosure, may be utilized as an egg-collection tray or receptacle. As illustrated (FIGS. 3c and 6), this is accomplished by attaching the chick guard to the forward edge extremity of the larger floor part 28. Structurally, the chick guard comprises a somewhat L-shaped mesh section 38 having substantially the same width as the front cage wall 12, and a pair of ends 40, which may be of sheet metal and which are attached along opposite side edges of the front section 38, generally perpendicular thereto. The chick guard 24 thus comprises an open-sided dish-like member of rectangular configuration.

When the chick guard 24 in installed on the front wall 12 of the cage enclosure (FIGS. 1, 3 and 5), the front section 38 thereof forms an outer barrier which extends upwardly from the feeder trough 22, whereas the ends 40 form a pair of spaced end barriers which extend generally between the outer barrier of section 38 and the front wall 12 of the cage enclosure, thereby forming a chamber for containing small chicks who may be able to pass through the larger mesh of the front cage wall 12, into or onto the feeder trough 22. As illustrated (FIGS. 1 and 5), the offset upper tip extremity of front barrier section 38 encloses the top of such chick-retaining chamber. The chick guard means 24 may conveniently be attached to the cage enclosure in this upright position by mounting it to the front wall 12, as for example by a cut-out portion 42 (FIG. 5) in each of the end barriers 40 which is so shaped and so disposed as to fit over one of the horizontal ribs or stringers making up the mesh front wall 12; as will be apparent, however, other suitable attachment structures may readily be used, including a wide variety of possible hooking, interconnecting, or securing members.

The attachment of the chick guard 24 to the larger floor portion 28 in its egg-collection position may also be accomplished by any desired fastening means, but the relative positions of the chick guard and floor extremity should be that illustrated in FIG. 6, i.e., with the chick guard forming a direct extension of the floor part 28 beyond the front wall 12 of the cage. For egg collection purposes, the front wall 12 of the cage proper terminates above the lowermost extremities of the side walls 16 and 18, to thereby provide an opening at the bottom of the front wall which allows eggs laid within the cage to roll down the inclined floor, under the front wall, and out of the cage enclosure onto the chick guard means 24 forming the egg-collection receptacle. For this purpose, the front section 38 of the chick guard should be disposed in substantially the same plane as the larger floor part 28, so that the egg transfer from one to the other is generally smooth. A very suitable means of securing the egg-collection receptacle formed by the chick guard means 24 onto the cage enclosure may be provided by having some outwardly-extending hooking portions on the lower extremities of the end barriers 40 (not specifically shown), or by some hooking extremities on the lowermost end of the mesh front section 38 thereof, which hooking extremities can engage with the wire mesh of which the floor is constructed.

It should be pointed out that although a single cage unit or structure is illustrated in the drawings herein, the cage construction of the invention is equally well suitable to elongated cage rows comprised of a large number of individual integrally connected cages, particularly the type of cage construction wherein long, flat mesh sections form the tops, front walls, rear walls, and even the floors of numerous laterally adjacent cage units, the side walls of which are formed by a series of spaced mesh partitions forming mutually independent cage sections from the elongated unitary cage structure. In such a construction, the long integral floor portion could be adjusted by downwardly pivoting the same to simultaneously change the floor level in each of the independent cage sections.

The chick guard means 24 for the type of construction noted just above would also be an elongated unitary structure, having a plurality of spaced end barriers 40 along its length, which are disposed at relative spacings equalling that of the partitions or side walls serving to define the individual cage sections. This relationship would establish a substantially coplanar alignment of each of the end barriers 40 in such an elongated chick guard means with the side wall partitions of the cage enclosure, and such an alignment is a valuable aspect of the present construction. This is because small chicks are definitely likely to make their way through the front cage wall and into the feeder trough, and without such end barriers in alignment with the side walls of the individual cage units, these chicks could pass from one independent cage section into another. This is, of course, contrary to the desired aim, which is to place a fixed number of chicks in each such cage section and to maintain this number during the growth of the birds.

Manifestly, an elongated chick guard means of the nature just described would be equally suitable as an egg-collection receptacle, in the general manner disclosed previously herein, i.e., by attachment to the floor portion in the same general manner set forth above. The convertibility of such chick guard means into an egg-collection receptacle is of very great benefit, since previously it was an absolute necessity to remove the birds from their growth cages whenever they began laying eggs, whether other suitable quarters were then ready for the birds or not, or whether they could be delivered to a new owner or not precisely at that time. Otherwise, all eggs were certain to be lost because they would inevitably be broken on the floor of the cages. In accordance with the present invention, however, it is no problem whatever to maintain birds in the cages even though their laying age has arrived. While it will be apparent that the egg-collection receptacles so provided are not really a permanent measure because they require manual collection, nonetheless laying birds can be maintained in the present cages for an indeterminate length of time if this is required.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit are to be considered.

I claim:

1. A poultry cage construction for growing birds, comprising in combination: a cage enclosure including front, rear and side wall portions; and a floor member for closing the bottom of such enclosure, said floor member having edge portions; means for movably securing said floor member along one such edge portion to one of said cage wall portions to change the vertical position of said floor member with respect to such cage wall portion; and releasable means for arresting other said floor member edge portions at different positions with respect to other of said cage walls; whereby said floor member may be vertically repositioned as the birds in said enclosure grow larger, to better accommodate such birds.

2. The poultry cage construction of claim 1, wherein said means for movably securing said floor member to one of said cage wall portions comprises a pivotable joint therebetween.

3. The poultry cage construction of claim 2, wherein said joint includes relatively slideable structures forming a hinge member.

4. The poultry cage construction of claim 2, wherein said releasable means includes hooking elements coacting between certain of said floor member edge portions and certain of said cage walls.

5. The poultry cage construction of claim 4, wherein at least one of said floor member of said certain cage walls is of mesh construction and said hooking elements comprise elements extendable through the openings in such mesh.

6. The poultry cage construction of claim 2, wherein said front wall portion has poultry feeding means located immediately outwardly adjacent thereof, and wherein said pivotable joint connects said floor member to said rear wall portion, such that said floor is pivotable with respect to said rear wall portion to raise and lower the edge of the floor nearest said feeding means.

7. The poultry cage construction of claim 2, wherein said floor member includes an integral transverse knee joint therein, by which such floor may be raised and lowered independently of said pivotable joint.

8. The poultry cage construction of claim 7, wherein said knee joint comprises a pair of mutually hinging floor parts.

9. The poultry cage construction of claim 8, wherein said front wall portion has poultry feeding means located immediately outwardly adjacent thereof, and wherein said pivotable joint connects said floor member to said rear wall portion, such that said floor is pivotable about said rear wall portion to raise and lower the edge of the floor nearest said feeding means.

10. The poultry cage construction of claim 9, wherein one of said floor parts comprises a relatively small flap-like part hinged by said knee joint to a relatively large main floor part, said flap-like part being located adjacent said rear wall portion and secured thereto by said pivotal joint.

11. The poultry cage construction of claim 10, wherein said poultry feeding means comprises a feeding-containing trough and a chick guard means extending upwardly from said trough adjacent said front cage wall portion, said guard means having an outer barrier spaced from said front wall portion and a pair of spaced end barriers extending generally from said outer barrier to said front wall, said barriers together defining a chamber for containing small chicks who have traversed said front wall and entered said trough.

12. The poultry cage construction of claim 11, wherein said outer barrier is generally coextensive laterally with said front cage wall such that said end barriers are spaced apart from each other about the same distance as said cage side wall portions and each such end barrier is generally coplanar with one such side wall portion.

13. The poultry cage construction of claim 12, wherein said front and rear wall portions are elongated in form with respect to said side wall portions and a plurality of such side walls extend between said front and rear walls to define a plurality of individual cage enclosures, wherein said outer barrier has substantially the same length as said elongated front wall, and wherein a plurality of said end barriers is provided, comprising a series of partitions mutually spaced along said outer barrier, one of such partitions being generally coplanar with each one of said side walls and extending forwardly thereof toward said outer barrier.

14. The poultry cage construction of claim 11, wherein said chick guard means defines an open-ended dish-like member securable to said cage enclosure generally adjacent said front wall and said floor to effectively form an outward extension of said floor in a position to function as an egg-collection tray.

15. In a poultry cage construction, of the general type comprising at least one walled cage enclosure of mesh material or the like having feeder trough means extending across a front side wall thereof, the improvement comprising: a chick guard means detachably mountable to said enclosure in a position adjacent said front side wall and defining a compartment immediately forwardly of such side wall and extending from a position adjacent the feeder trough upwardly and at least partially across the front side wall; said chick guard means also being detachably mountable to said enclosure as a forward extension of the floor thereof, to form an egg-collection receptacle.

16. The improvement in poultry cage constructions of claim 15, wherein said chick guard means has a size and shape such that when mounted adjacent said front side to form said compartment it extends substantially across said front side, from one edge thereof to the other.

17. The improvement in poultry cage constructions of claim 16, wherein said chick guard means comprises a walled member having at least three generally flat wall portions, including a primary wall portion lying generally parallel to said front cage side and a pair of spaced end wall portions attached to said primary wall portion and extending between it and said front cage side.

18. The improvement in poultry cage constructions of claim 17, wherein said chick guard means is mountable to said cage enclosure by attachment means connecting said end wall portions of said walled member to said enclosure.

References Cited

UNITED STATES PATENTS

| 2,612,862 | 10/1952 | Ipsen | 119—18 |
| 2,683,438 | 7/1954 | Peterson | 119—48 |
| 3,234,909 | 2/1966 | Graves et al. | 119—45 |

ALDRICH F. MEDBERY, Primary Examiner

U.S. Cl. X.R.

119—17